(12) United States Patent
Takada et al.

(10) Patent No.: US 6,215,651 B1
(45) Date of Patent: Apr. 10, 2001

(54) SOLID ELECTROLYTE CAPACITOR USING CONDUCTIVE POLYMER

(75) Inventors: Daisuke Takada; Takashi Fukaumi; Kenji Araki; Yuji Aoki; Kenichi Takahashi, all of Toyama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/241,608

(22) Filed: Feb. 2, 1999

(30) Foreign Application Priority Data

Feb. 2, 1998 (JP) .................................................. 10-020707

(51) Int. Cl.$^7$ ....................................................... H01G 9/02
(52) U.S. Cl. ............................ 361/523; 361/524; 361/525
(58) Field of Search ..................................... 361/523, 524, 361/525, 528, 526; 252/500

(56) References Cited

U.S. PATENT DOCUMENTS

| | | | |
|---|---|---|---|
| 5,461,537 | * 10/1995 | Kobayashi et al. | ................... 361/525 |
| 5,621,608 | * 4/1997 | Araii et al. | ............................ 361/525 |
| 5,729,428 | * 3/1998 | Sakata et al. | ......................... 361/523 |
| 5,965,062 | * 10/1999 | Sakata et al. | ......................... 252/500 |

* cited by examiner

Primary Examiner—Anthony Dinkins
(74) Attorney, Agent, or Firm—Young & Thompson

(57) ABSTRACT

A multilayer structure in a solid electrolyte capacitor. The multilayer structure extends over a pore and a peripheral surface in the vicinity of the pore in a porous surface. The multilayer structure includes a dielectric layer having a first part extending on an inner surface of the pore and a second part extending on an outer surface of the peripheral surface; a first coupling layer extending on the first part of the dielectric layer; a first conductive polymer layer extending on the first coupling layer; a second coupling layer extending on at least the second part of the dielectric layer; and a second conductive polymer layer extending on the second coupling layer so that the second conductive polymer layer extends at least over the peripheral surface.

6 Claims, 10 Drawing Sheets

SOLID ELECTROLYTE CAPACITOR USING CONDUCTIVE POLYMER

BACKGROUND OF THE INVENTION

The present invention relates to a solid electrolyte capacitor and a method of forming the same, and more particularly to a solid electrolyte capacitor using a conductive polymer and being improved in reliability and a method of forming the same.

As the requirements for down-sizing and improvement in high speed performances and digitalization of electronic devices have increased, also it has now been required to reduce the scale of the capacitor and increase the capacitance thereof as well as reduce the impedance in high frequency band.

In prior art, mica capacitors and multilayer ceramic capacitors have been known as capacitors useable in high frequency ranges. The increase in the capacitance of those capacitors likely to result in enlargement in size of the capacitors, for which reason those capacitors are unsuitable for down-sizing. Namely, the mica capacitors and the multilayer ceramic capacitors arc advantageous in the high frequency performances.

Various electrolyte capacitors such as aluminum electrolyte capacitors and tantalum solid electrolyte capacitors have been known in prior art as being advantages in large capacitance. Those electrolyte capacitors are, however, disadvantages in high resistivity of electrolyte. For example, the aluminum electrolyte capacitor is disadvantageous in high resistivity of its electrolytic solution. The tantalum solid electrolyte capacitor is disadvantageous in high resistivity of manganese dioxide. Such high resistivity of the electrolyte makes it difficult to realize a low impedance characteristic in high frequency range.

In Japanese laid-open patent publication No. 52-79255, it is disclosed to use a low-resistive organic semiconductor, for example, 7,7,8,8-tetracyanoquinodimethane complex salt (TCNQ salt) for electrolyte of the electrolyte capacitor in order to reduce the impedance in high frequency range.

In Japanese patent publication No. 4-56445, it is disclosed to use a conductive polymer, which is lower in resistivity than manganese dioxide and TCNQ salt, for a solid electrolyte thereby to obtain a further reduction in impedance in high frequency range. This solid electrolyte capacitor using the conductive polymer has a great deal of advantages in lower resistance of the conductive polymer, for which reason this solid electrolyte capacitor is attractive and actively developed to further improve its other characteristics.

In Japanese laid-open patent publication No. 2-74021, it is disclosed that an anodic oxidation or an anodization is carried out to form an dielectric oxide coating film on a surface of a valve metal for subsequent surface treatment thereof by use of a silane coupling agent, a titanium coupling agent or an aluminum coupling agent, before an electrolytic polymerization is carried out to form a conductive polymer as a solid electrolyte. It is also disclosed that an anodic oxidation or an anodization is carried out to form an dielectric oxide coating film on a surface of a valve metal for subsequent adhesion of manganese dioxide on the dielectric oxide coating film on the surface of the valve metal and a further surface treatment thereof by use of a silane coupling agent, a titanium coupling agent or an aluminum coupling agent, before an electrolytic polymerization is carried out to form a conductive polymer as a solid electrolyte. The coupling agents described above are used to improve in adhesiveness between a porous layer and a conductive polymer layer as well as between manganese dioxide and the electrically conductive polymer film in order to prevent any substantive reduction in electrostatic capacitance and any deterioration in loss factor under a high temperature condition.

In Japanese laid-open patent publication No. 4-73924, it is disclosed that an dielectric oxide coating film is formed on a surface of a valve metal as an anodic foil for subsequent polymerization to form a conductive polymer on the anodic foil, wherein a silane coupling agent is present between the anodic foil and the conductive polymer, so as to improve in adhesiveness between the porous layer and the conductive polymer layer, thereby preventing any substantive reduction in electrostatic capacitance and any deterioration in loss factor under a high temperature condition.

In Japanese laid-open patent publication No. 8-293436, there is disclosed a solid electrolyte capacitor having a solid electrolyte comprising a conductive polymer, wherein an electron donors organic compound between an dielectric oxide coating film and a conductive polymer compound layer, wherein the electron donors organic compound is except for anion surfactant, silane coupling agent, aluminum coupling agent and titanium coupling agent. In the process for forming the electron donor organic compound layer, a porous pellet is exposed to a vapor of the electron donors organic compound, whereby a thin and uniform film of the electron donors organic compound is formed on the porous pellet independently from the kinds of the electron donors organic compounds. Alternatively, it is also possible to dip or immerse the porous pellet into a solution containing the electron donors organic compound. Those techniques provide the solid electrolyte capacitor free from any increased leakage of current under the high temperature conditions.

Figure 1:
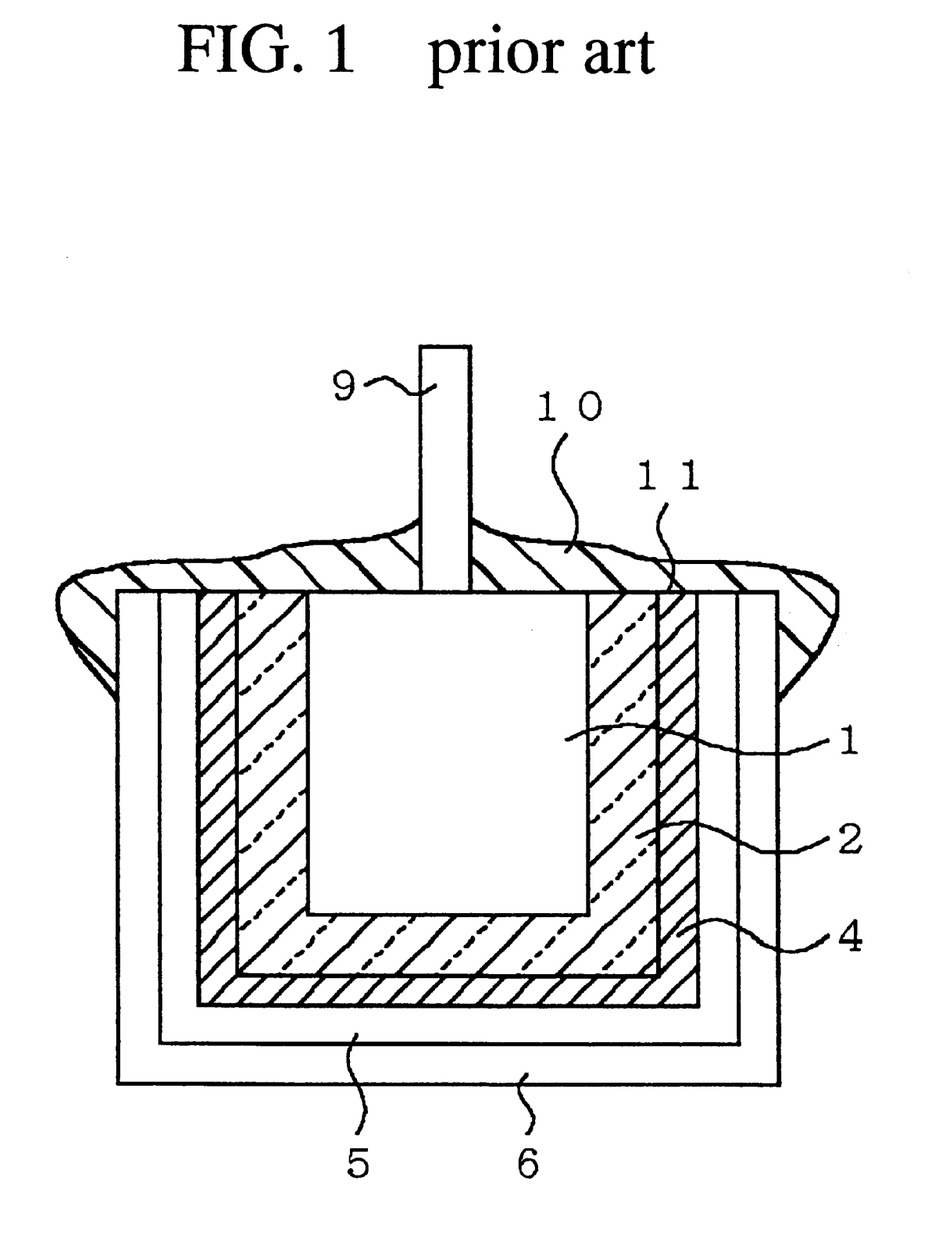
FIG. 1 is a fragmentary cross sectional elevation view illustrative of the conventional solid electrolyte capacitor having the semiconductor layer comprising the conductive polymer.

In Japanese laid-open patent publication No. 9-45591, there is disclosed a solid electrolyte capacitor having a semiconductor layer comprising a conductive polymer as illustrated in FIG. 1, wherein an anode lead 9 is embedded in a tantalum porous pellet 1 having a surface coated with a $Ta_2O_5$ dielectric oxide coating film 2 which is further coated with a conductive polymer film 4 which is furthermore coated with a graphite layer 5 which is more over coated with a silver paste layer 6. Further, a filler-containing epoxy resin 10 is formed as an insulating resin to cover both an opening end 11 of the conductive layer 4 and adjacent parts thereto for sealing an opening end 11 of the conductive layer 4 from oxygen thereby preventing oxygen from entering through the filler-containing epoxy resin 10 into the opening end 11 of the conductive layer 4. The prevention of entry of oxygen into the opening end 11 of the conductive layer 4 results prevention of oxidation reaction at a high temperature. This prevention of oxidation reaction prevents increases in resistivity and equivalent series resistance (ESR) of the capacitor.

As described above, various developments have now been made of the solid electrolyte capacitor using the conductive polymer as the solid electrolyte for the purposes of further improvements in electric characteristics and reliability of the capacitor. Further, prior to chemical polymerization or electrolyte polymerization, the silane coupling agent is used for the surface treatment of the dielectric oxide coating film for improvement in adhesiveness between the dielectric oxide coating film and the conductive polymer layer. Notwithstanding, the prior art had taken no account of improvement in adhesiveness, during polymerization, between the conductive polymer compound layer and the dielectric oxide coating film on the surface of the pore-portion. For those reasons, the solid electrolyte capacitor using the conventional is engaged with the following problems. The conductive polymer layer is likely to be peeled from the surface of the pore-portion during the formation of the conductive polymer layer on the surface of the pore-portion. This peeling, of the conductive polymer layer from the surface of the pore-portion results in an increase in leakage of current and a deterioration in equivalent series resistance, whereby the reliability of the capacitor is thus lost.

Figure 2A:
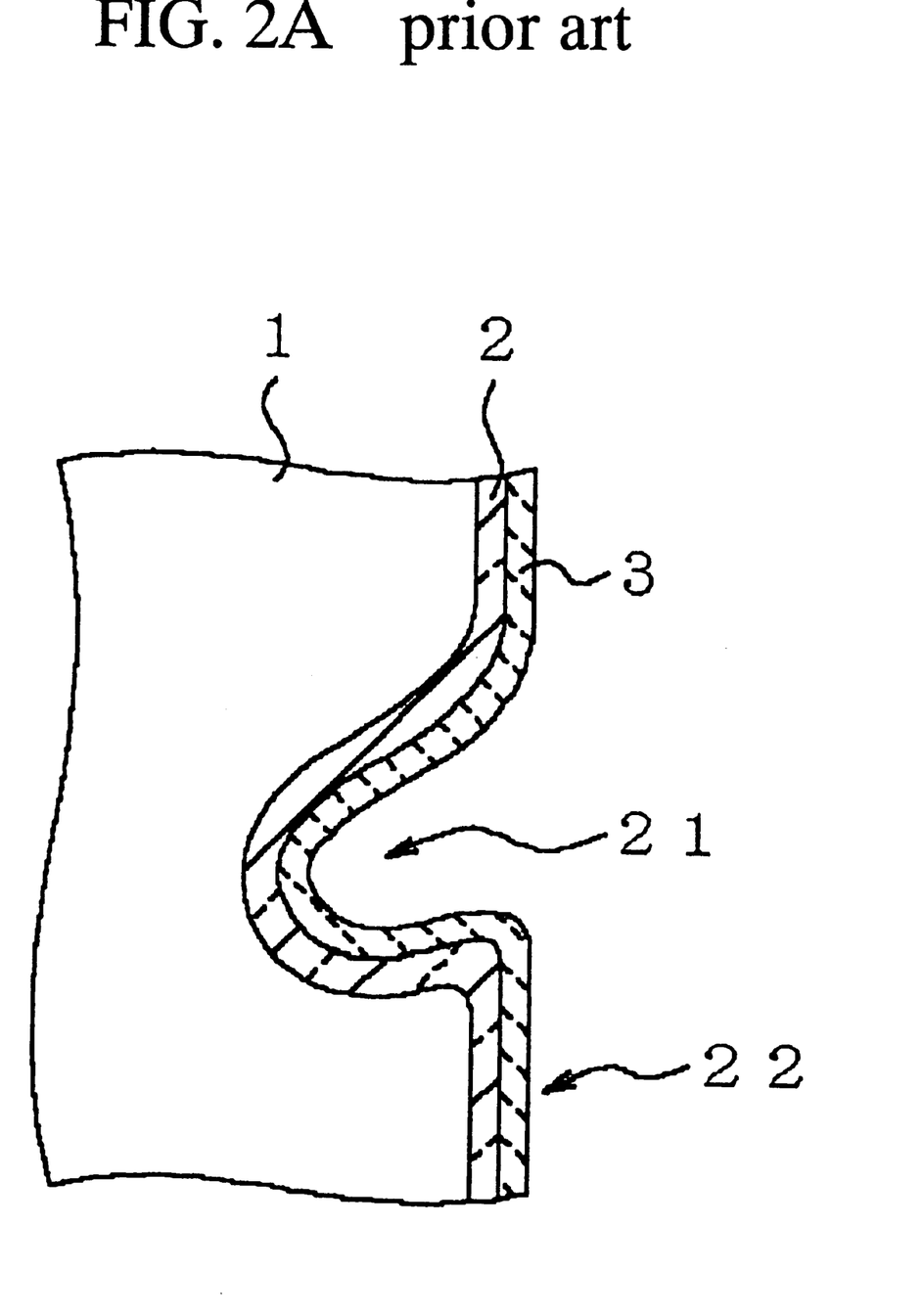
FIGS. 2A through 2C are fragmentary cross sectional elevation views illustrative of a conventional method of forming conductive polymer layers over a porous surface.
Figure 2B:
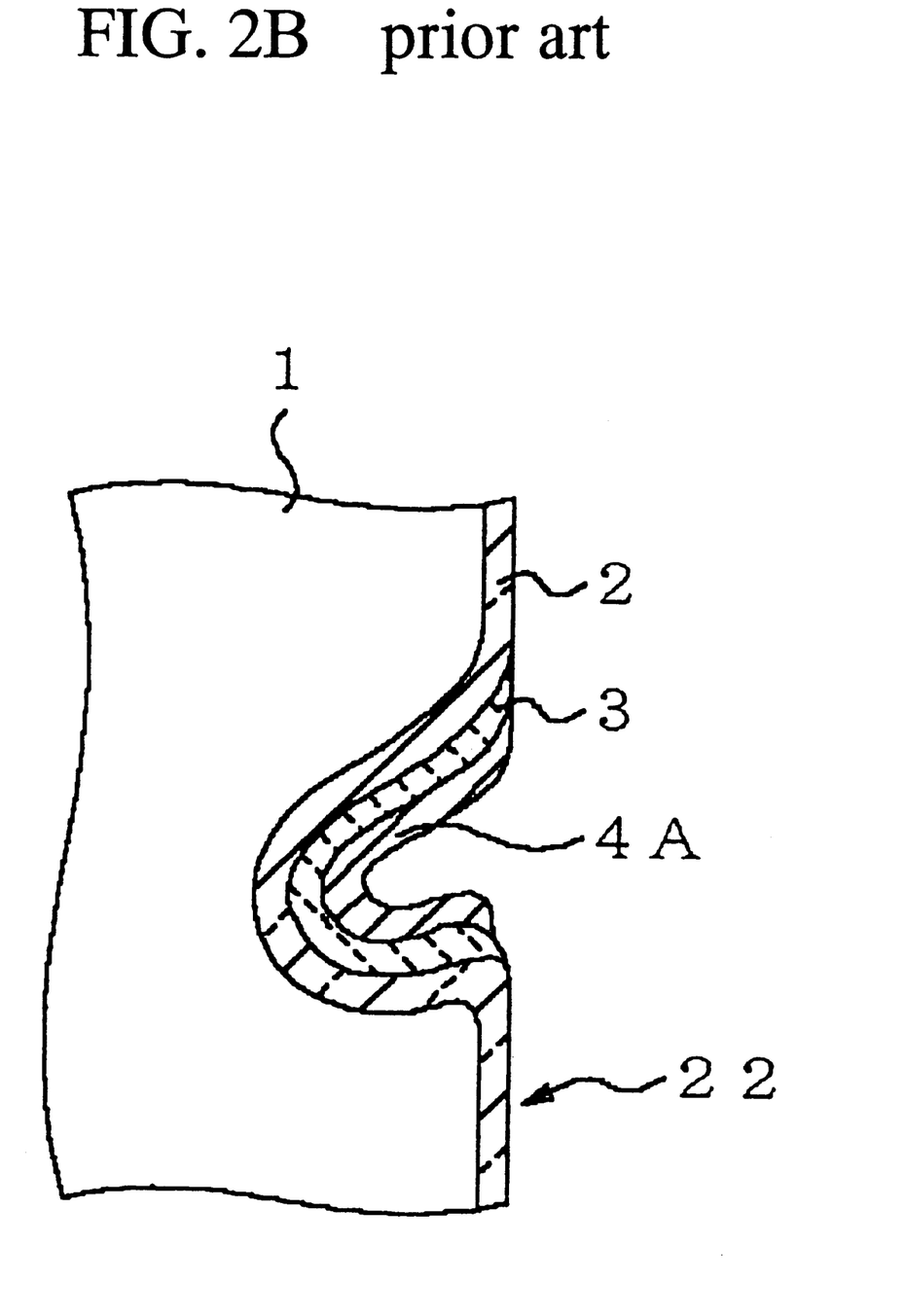
Figure 2C:
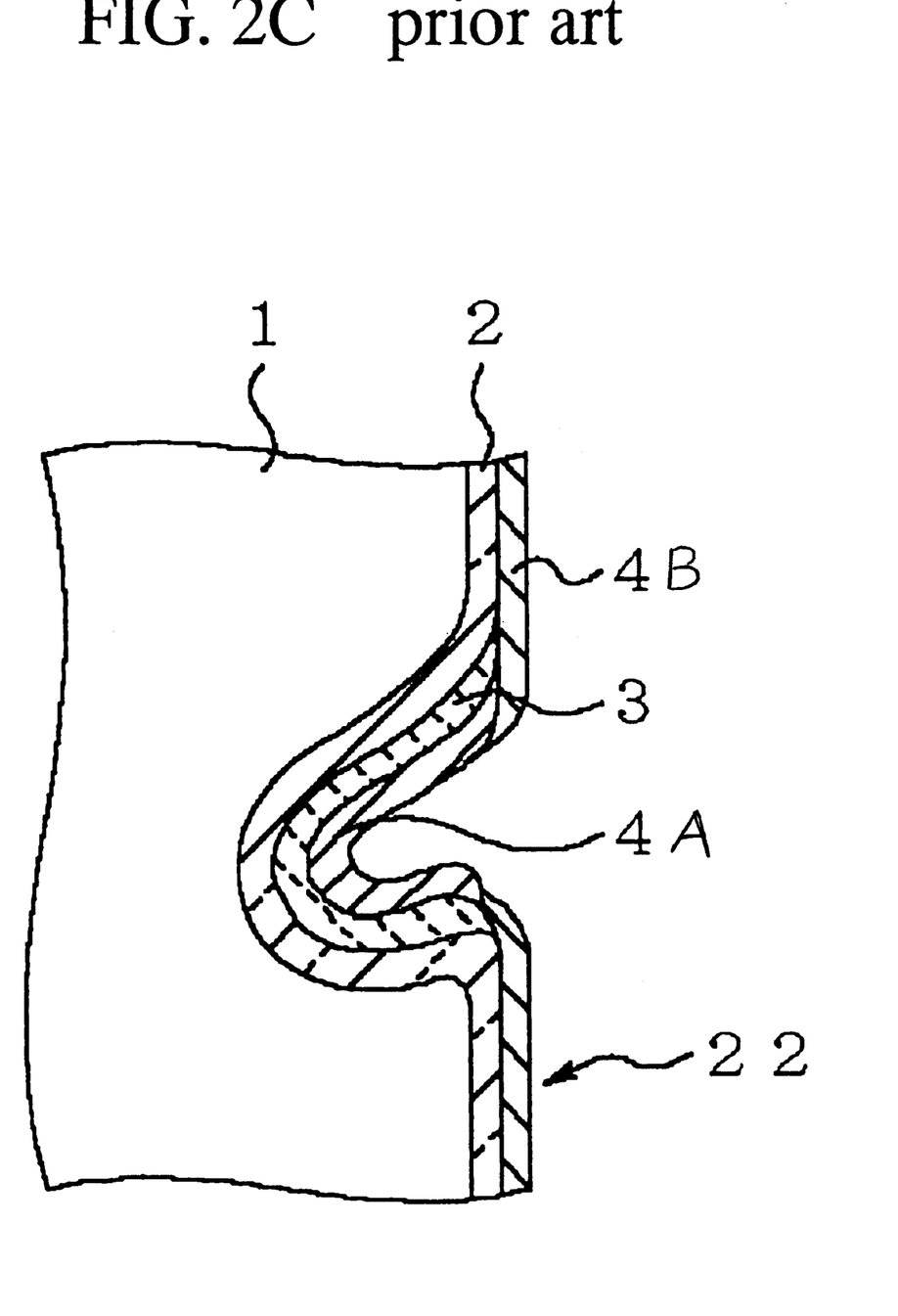

FIGS. 2A through 2B are fragmentary cross sectional elevation views illustrative of a conventional method of forming conductive polymer layers over a porous surface.

With reference to FIG. 2A, an dielectric oxide coating film 2 is formed over surfaces of a pore-inside portion 21 of a tantalum porous pellet 1 and a pore-outside portion 22. A silane coupling agent layer 3 is laminated on the dielectric oxide coating film 2.

With reference to FIG. 2B, a first conductive polymer layer 4A is formed on the silane coupling agent layer 3, however, in the pore-inside portion 21 by dipping several times of the pellet 1 into a polymerization reaction solution, wherein the silane coupling agent layer 3 except in the pore-inside portion 21 is etched by the polymerization reaction solution.

With reference to FIG. 2C, a second conductive polymer layer 4B is formed over the pore-outside portion 22 but on the dielectric oxide coating film 2. Namely, the second conductive polymer layer 4B is laminated directly on the dielectric oxide coating film 2 over the pore-outside portion 22 without, however, intervening the silane coupling agent layer 3, for which reason no intervention of the silane coupling agent layer 3 between the dielectric oxide coating film 2 allows peeling of the second conductive polymer layer 4B.

In the above circumstances, it had been required to develop a novel solid electrolyte capacitor using a conductive polymer layer as a solid electrolyte which is free from peeling from an outer surface outside a pore of a porous surface for improvement in reliability of the capacitor and a method of forming the same.

SUMMARY OF THE INVENTION

Accordingly, it is an object of the present invention to provide a novel solid electrolyte capacitor using a conductive polymer layer as a solid electrolyte free from the above problems.

It is a further object of the present invention to provide a novel solid electrolyte capacitor using a conductive polymer layer as a solid electrolyte which is free from peeling from an outer surface outside a pore of a porous surface for improvement in reliability of the capacitor.

It is a still further object of the present invention to provide a novel method of forming a solid electrolyte capacitor using a conductive polymer layer as a solid electrolyte free from the above problems.

It is yet a further object of the present invention to provide a novel method of forming a solid electrolyte capacitor using a conductive polymer layer as a solid electrolyte which is free from peeling from an outer surface outside a pore of a porous surface for improvement in reliability of the capacitor.

The present invention provides a multilayer structure in a solid electrolyte capacitor. The multilayer structure extends over a pore and a peripheral surface in the vicinity of the pore in a porous surface. The multilayer structure comprises: a dielectric layer comprising a first part extending on an inner surface of the pore and a second part extending on an outer surface of the peripheral surface; a first coupling layer extending on the first part of the dielectric layer; a first conductive polymer layer extending on the first coupling layer; a second coupling layer extending on at least the second part of the dielectric layer; and a second conductive polymer layer extending on the second coupling layer so that the second conductive polymer layer extends at least over the peripheral surface.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

The first aspect of the present invention provides a multilayer structure in a solid electrolyte capacitor. The multilayer structure extends over a pore and a peripheral surface in the vicinity of the pore in a porous surface. The multilayer structure comprises: a dielectric layer comprising a first part extending on an inner surface of the pore and a second part extending on an outer surface of the peripheral surface; a first coupling layer extending on the first part of the dielectric layer; a first conductive polymer layer extending on the first coupling layer; a second coupling layer extending on at least the second part of the dielectric layer; and a second conductive polymer layer extending on the second coupling layer so that the second conductive polymer layer extends at least over the peripheral surface.

It is preferable that the second coupling layer extends both on the second part of the dielectric layer and on the first conductive polymer.

It is further preferable that the second conductive polymer extends on a part of the second coupling layer so that the second conductive polymer extends over the peripheral surface only.

The second aspect of the present invention provides a solid electrolyte capacitor comprising: a valve metal having a porous surface comprising pores and those peripheral surfaces; a dielectric layer comprising first parts extending on inner surfaces of the pores and second parts extending on outer surfaces of the peripheral surfaces, so that the dielectric layer coating the porous surface of the valve metal; a multilayer structure coating the dielectric layer; at least a conductive layer coating the multilayer structure, wherein the multilayer structure further comprising: first coupling layers extending on the first parts of the dielectric layer; first conductive polymer layers extending on the first coupling layers; a second coupling layer extending on at least the second parts of the dielectric layer; and a second conductive polymer layer extending on the second coupling layer so that the second conductive polymer layer extends at least over the peripheral surface.

It is preferable that the second coupling layer extends both on the second part of the dielectric layer and on the first conductive polymer.

It is further preferable that the second conductive polymer extends on a part of the second coupling layer so that the second conductive polymer extends over the peripheral surface only.

The third aspect of the present invention provides a method of forming a conductive polymer layer in a solid electrolyte capacitor. The method comprises the steps of: carrying out a first polymerization to form a first conductive polymer layer in each pore of a porous surface; making the porous surface into contact with a coupling agent to form a coupling agent layer at least on peripheral surface of the each pore of the porous surface and carrying out a second polymerization to form a second conductive polymer layer at least on the coupling agent layer.

The fourth aspect of the present invention provides a method of forming a conductive polymer layer in a solid electrolyte capacitor by a polymerization process which is intervened by an intervening process for contact with a coupling agent.

The above aspect of the present inventions will be described in detail with reference to the accompanying drawings.

Figure 3:
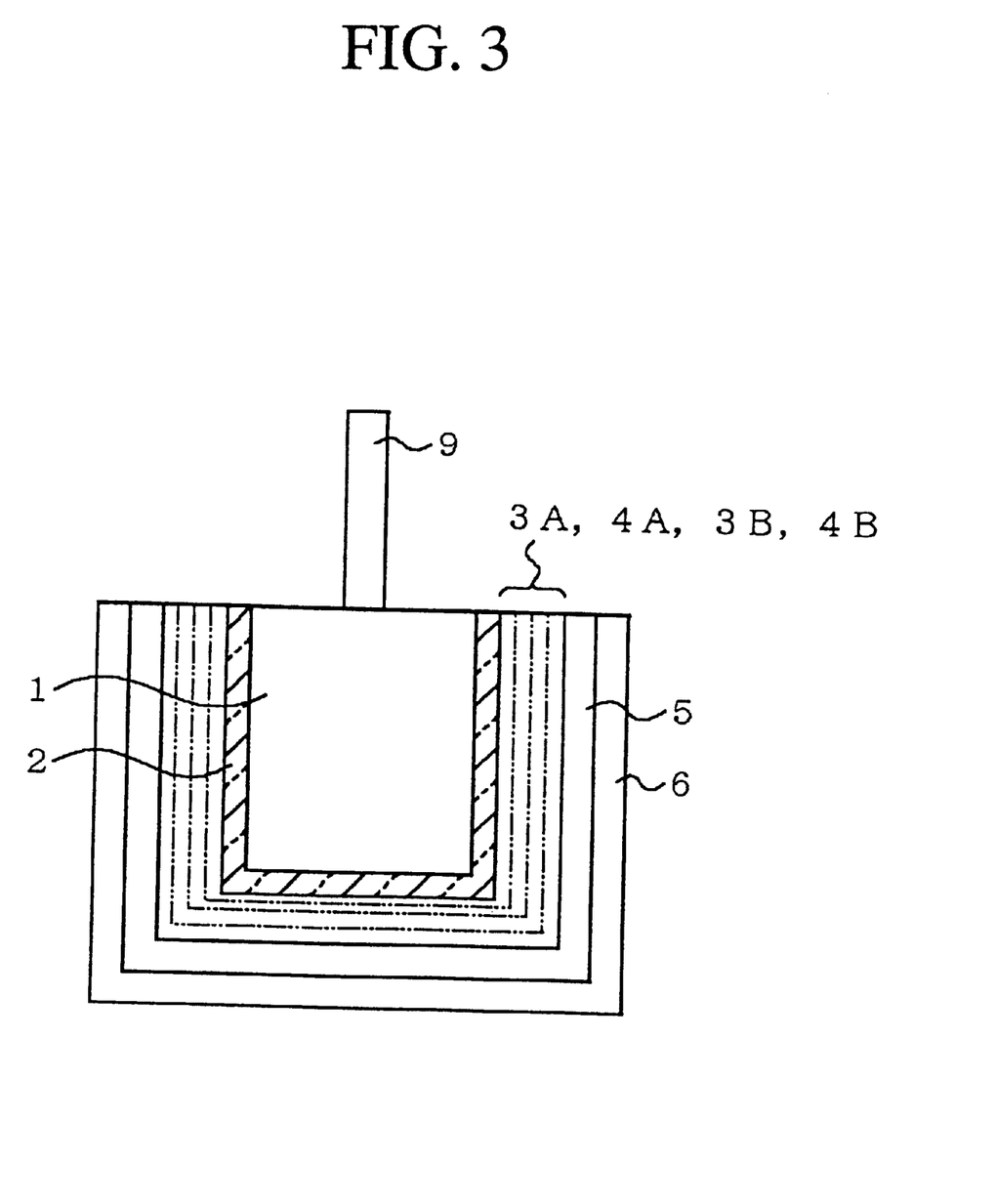
FIG. 3 is a cross sectional elevation view illustrative of a novel solid electrolyte capacitor in accordance with the present invention.
Figure 4:
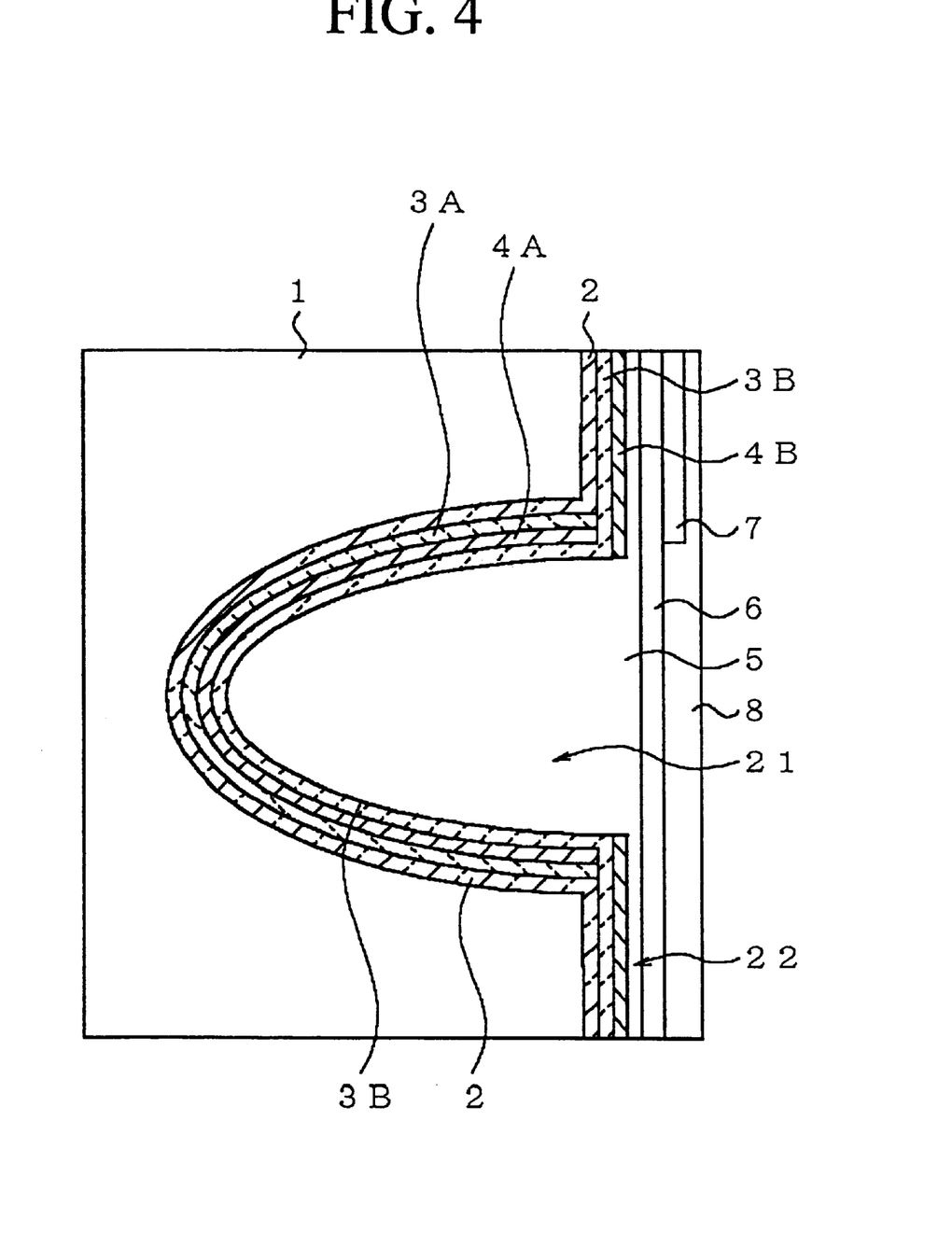
FIG. 4 is a fragmentary enlarged cross sectional elevation view illustrative of a novel multilayer structure of silane coupling layers and conductive layers within and in the vicinity of a pore on a porous surface of a valve metal of a novel solid electrolyte capacitor of FIG. 1 in accordance with the present invention.

FIG. 3 is a cross sectional elevation view illustrative of a novel solid electrolyte capacitor. FIG. 4 is a fragmentary enlarged cross sectional elevation view illustrative of a novel multilayer structure of silane coupling layers and conductive layers within and in the vicinity of a pore on a porous surface of a valve metal of a novel solid electrolyte capacitor of FIG. 1.

With reference to FIG. 3, an anode lead 9 is embedded in a tantalum porous pellet 1 having a porous surface coated with a $Ta_2O_5$ dielectric oxide coating film 2 which is further coated with a multilayer structure of a silane coupling agent layers 3A and 3B and conductive polymer layers 4A and 4B. This multilayer structure is furthermore coated with a graphite layer 5 which is more over coated with a silver paste layer 6.

With reference to FIG. 4, the above multilayer structure will be described as follows. A part of the porous surface of the tantalum porous pellet 1 includes a pore-inside region 21 and a pore-outside region 22. The $Ta_2O_5$ dielectric oxide coating film 2 is formed which extends over surfaces of the tantalum porous pellet 1 in the pore-inside region 21 and the pore-outside portion 22. A first silane coupling agent layer 3A is formed on the $Ta_2O_5$ dielectric oxide coating film 2 but only in the pore-inside region 21. A first conductive polymer layer 4A is formed on the first silane coupling agent layer 3A so that the first conductive polymer layer 4A extends in the pore-inside region 21. A second silane coupling agent layer 3B is formed both on the first conductive polymer layer 4A in the pore-inside region 21 and the $Ta_2O_5$ dielectric oxide coating film 2 in the pore-outside portion 22, so that the second silane coupling agent layer 3B extends both in the pore-inside region 21 and the pore-outside portion 22. A second conductive polymer layer 4B is formed on the second silane coupling agent layer 3B but only in the pore-outside region 22, so that the second conductive polymer layer 4B extends only in the pore-outside region 22. The graphite layer 5 is formed which extends both on the second silane coupling agent layer 3B in the pore-inside region 21 and on the second conductive polymer layer 4B, so that the graphite layer 5 extends both in the pore-inside region 21 and the pore-outside portion 22. The silver paste layer 6 extends on the graphite layer 5 both in the pore-inside region 21 and the pore-outside portion 22. An external electrode 7 is selectively formed on the silver paste layer 6. An armor resin film is formed covering the external electrode 7 and the silver paste layer 6.

In accordance with the present invention, the first conductive polymer layer 4A extending only in the pore-inside region 21 is securely adhered to the $Ta_2O_5$ dielectric oxide coating film 2 through the first silane coupling agent layer 3A extending only in the pore-inside region 21, for which reason the first conductive polymer layer 4A is free from the problem with a possible peeling from the $Ta_2O_5$ dielectric oxide coating film 2. The second conductive layer 4B extending only in the pore-outside portion 22 is also securely adhered to the $Ta_2O_5$ dielectric oxide coating film 2 through the second silane coupling agent layer 3B in the pore-outside region 22, for which reason the second conductive polymer layer 4B is free from the problem with a possible peeling from the $Ta_2O_5$ dielectric oxide coating film 2.

Figure 5A:
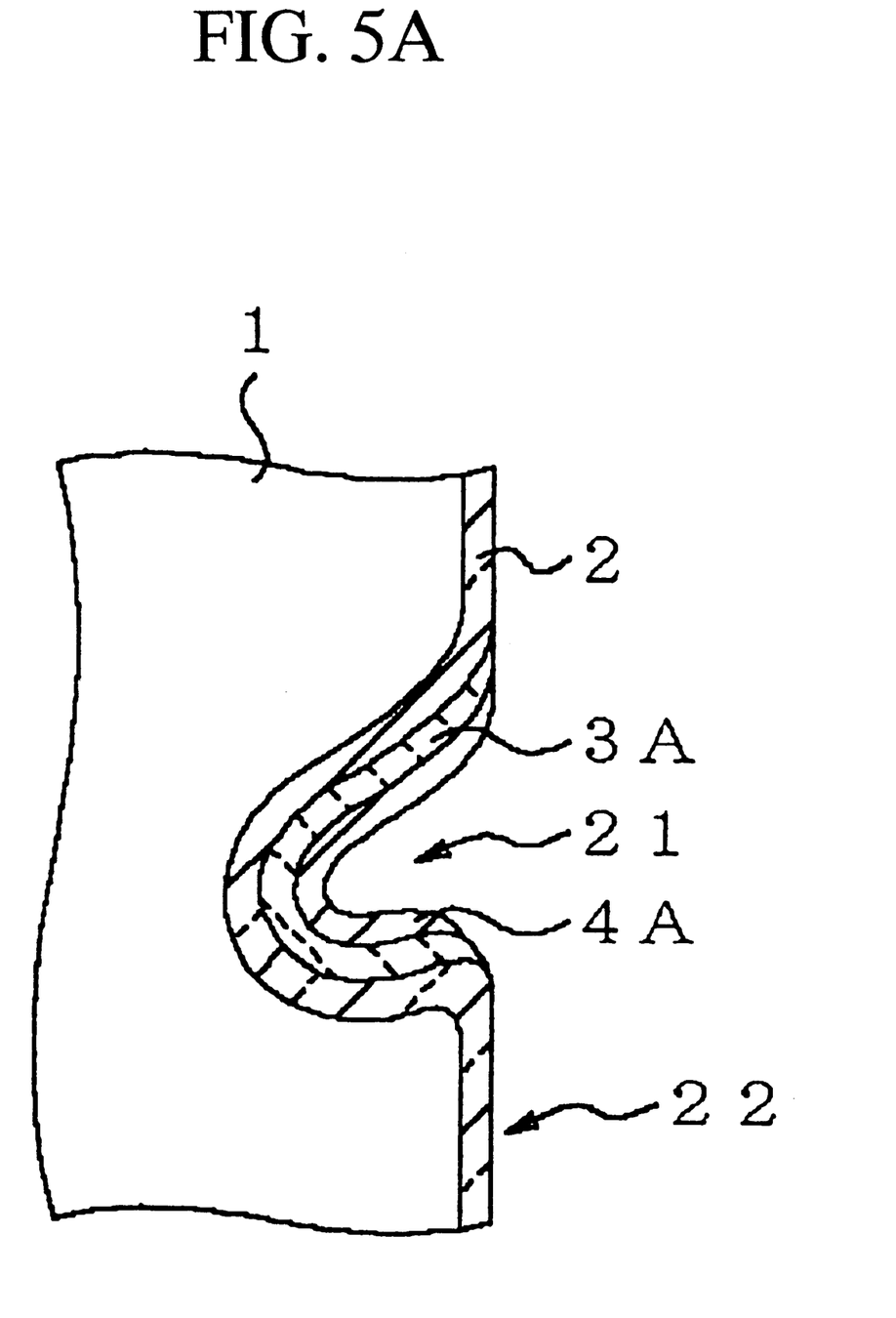
FIGS. 5A through 5C are fragmentary cross sectional elevation views illustrative of a novel method of forming conductive polymer layers over a porous surface in accordance with the present invention.
Figure 5B:
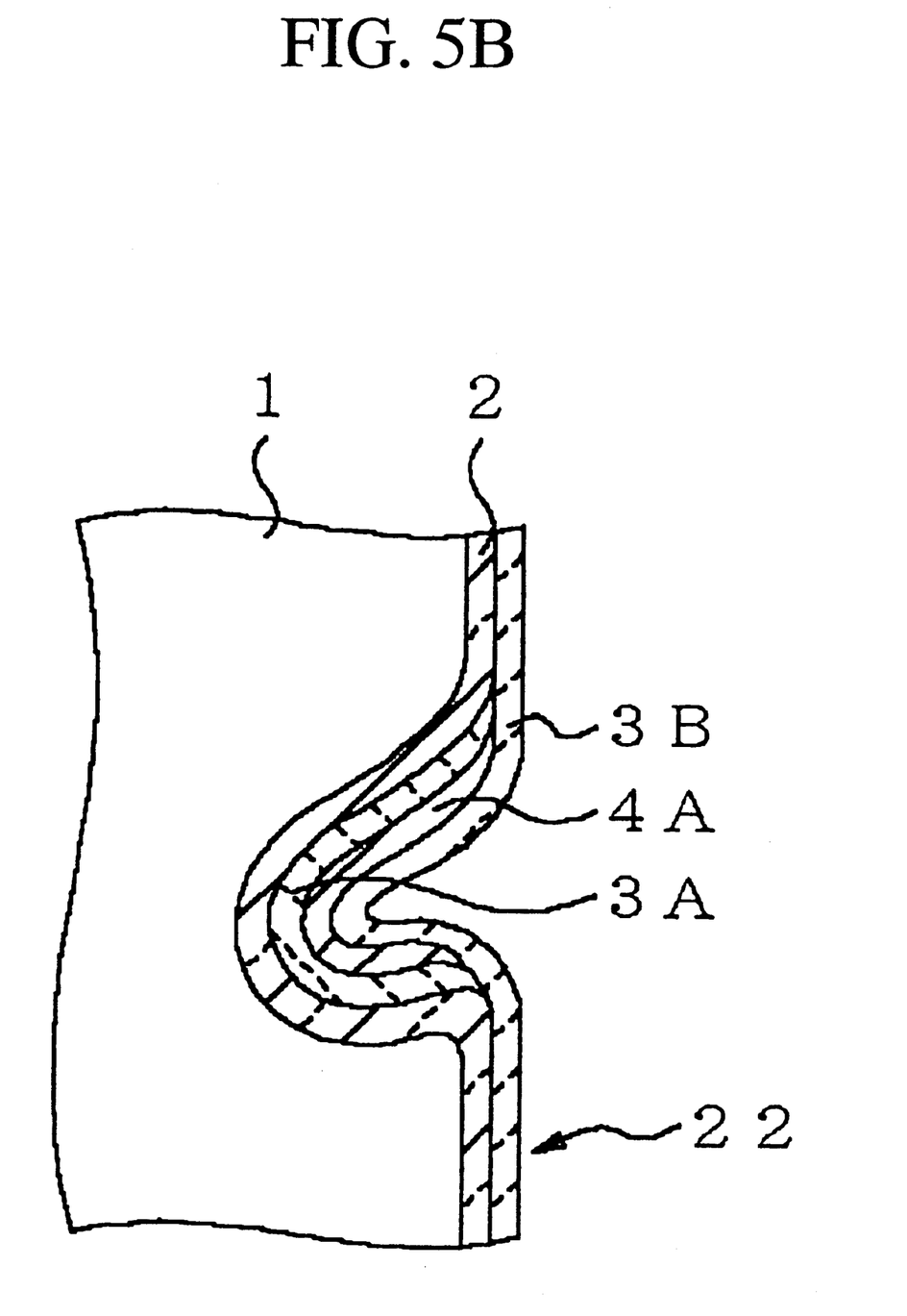
Figure 5C:
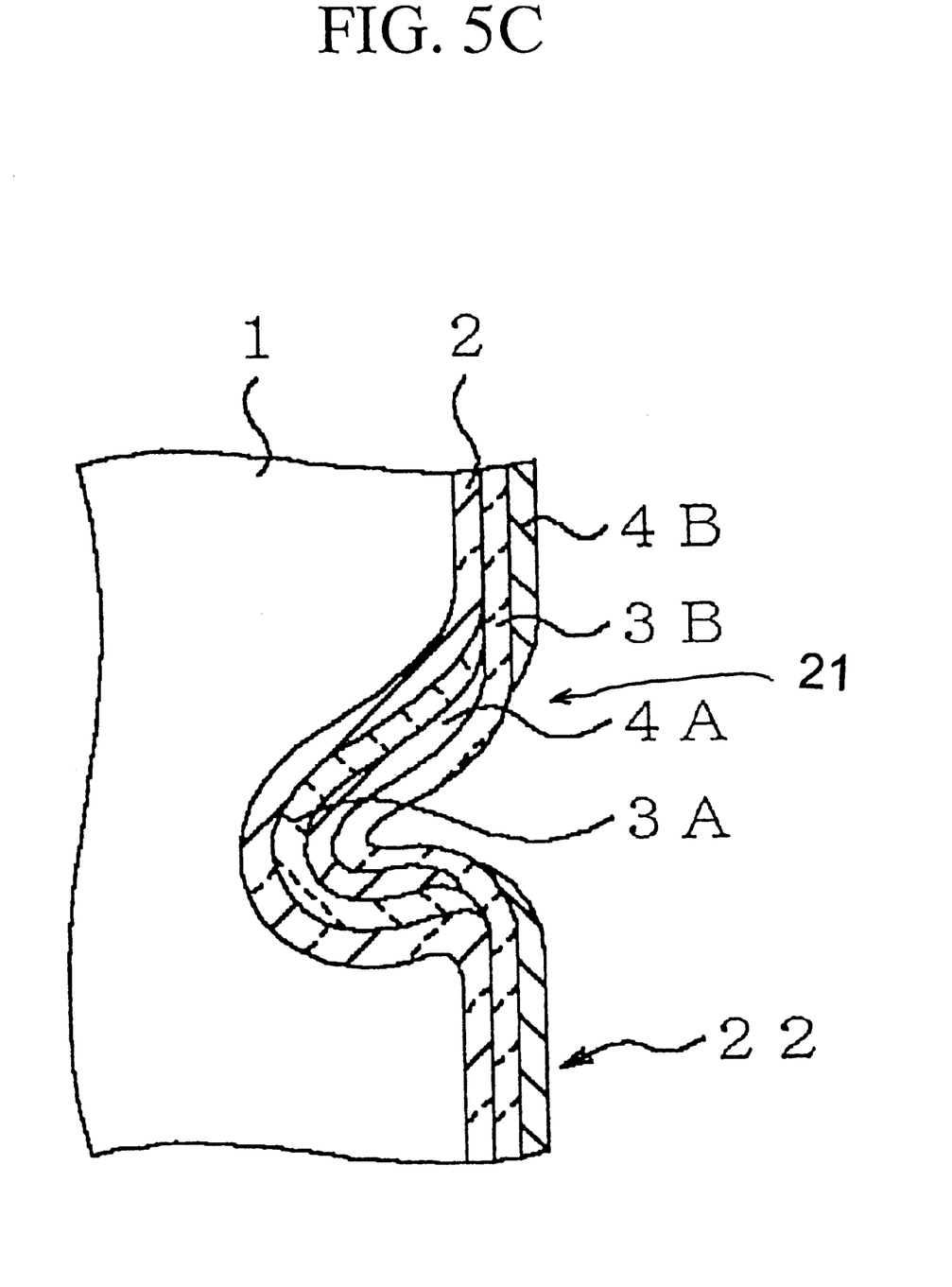

FIGS. 5A through 5B are fragmentary cross sectional elevation views illustrative of a novel method of forming conductive polymer layers over a porous surface.

With reference to FIG. 5A, an dielectric oxide coating film 2 is formed on a surface of the tantalum porous pellet 1 so that the dielectric oxide coating film 2 extends both in the pore-inside portion 21 and the pore-outside portion 22. A first silane coupling agent layer 3A is laminated on the dielectric oxide coating film 2, so that the first silane coupling agent layer 3A also extends both in the pore-inside portion 21 and the pore-outside portion 22. The pellet 1 is dipped several times into a polymerization reaction solution thereby to selectively form a first conductive polymer layer 4A on the first silane coupling agent layer 3A but only within the pore-inside portion 21, whilst the first silane coupling agent layer 3A in the pore-outside portion 22 is etched by the polymerization reaction solution whereby the dielectric oxide coating film 2 is exposed in the pore-outside portion 22.

With reference to FIG. 5B, a second silane coupling agent layer 3B is formed both on the first conductive polymer layer 4A in the pore-inside portion 21 and on the dielectric oxide coating film 2 in the pore-outside portion 22 by dipping the pellet 1 into a silane coupling agent solution.

With reference to FIG. 5C, a second conductive polymer layer 4B is formed on the dielectric oxide coating film 2 in the pore-outside portion 22.

In accordance with the present invention, the first conductive polymer layer 4A extending only in the pore-inside region 21 is securely adhered to the dielectric oxide coating film 2 through the first silane coupling agent layer 3A extending only in the pore-inside region 21, for which reason the first conductive polymer layer 4A is free from the problem with a possible peeling from the dielectric oxide coating film 2. The second conductive layer 4B extending only in the pore-outside portion 22 is also securely adhered to the dielectric oxide coating film 2 through the second silane coupling agent layer 3B in the pore-outside region 22, for which reason the second conductive polymer layer 4B is free from the problem with a possible peeling from the dielectric oxide coating film 2.

EXAMPLE 1

A rectangular parallelepiped tantalum pellet of 3.0 mm×3.2 mm×1.5 mm was prepared to be subsequently subjected to an anodic oxidation in a phosphoric acid solution applied with a voltage thereby to form a tantalum porous pellet having a porous surface. An electrostatic capacitance of the pellet was measured in the phosphoric acid solution. The measured electrostatic capacitance was 100 micro-F.

An dielectric oxide coating film was formed on the porous surface of the tantalum porous pellet. A silane coupling agent was applied on the dielectric oxide coating film which coats the tantalum porous pellet for natural dry and subsequent heat dry at 125° C., thereby to form a first silane coupling agent layer on entire surface of the dielectric oxide coating film which coats the tantalum porous pellet.

Subsequently, first conductive polymer layers of polypyrrole were formed within pores on the porous surface of the tantalum porous pellet by a chemical polymerization. A silane coupling agent was again applied for natural dry and subsequent heat dry at 125° C., thereby to form a second silane coupling agent layer. A second conductive polymer layer of polypyrrole was formed by a chemical polymerization. A graphite layer and a silver paste layer were formed. An external electrode was provided and then an armor resin film was further provided, thereby completing the novel solid electrolyte capacitor of FIG. 3.

EXAMPLE 2

A rectangular parallelepiped tantalum pellet of 3.0 mm×3.2 mm×1.5 mm was prepared to be subsequently subjected to an anodic oxidation in a phosphoric acid solution applied with a voltage thereby to form a tantalum porous pellet having a porous surface. An electrostatic capacitance of the pellet was measured in the phosphoric acid solution. The measured electrostatic capacitance was 100 micro-F.

An dielectric oxide coating film was formed on the porous surface of the tantalum porous pellet. A silane coupling agent was applied on the dielectric oxide coating film which coats the tantalum porous pellet for natural dry and subsequent heat dry at 125° C., thereby to form a first silane coupling agent layer on entire surface of the dielectric oxide coating film which coats the tantalum porous pellet.

Subsequently, first conductive polymer layers of polythiophene were formed within pores on the porous surface of the tantalum porous pellet by a chemical polymerization. A silane coupling agent was again applied for natural dry and subsequent heat dry at 125° C., thereby to form a second silane coupling agent layer. A second conductive polymer layer of polypyrrole was formed by a chemical polymerization. A graphite layer and a silver paste layer were formed. An external electrode was provided and then an armor resin film was further provided, thereby completing the novel solid electrolyte capacitor of FIG. 3.

EXAMPLE 3

A rectangular parallelepiped tantalum pellet of 3.0 mm×3.2 mm×1.5 mm was prepared to be subsequently subjected to an anodic oxidation in a phosphoric acid solution applied with a voltage thereby to form a tantalum porous pellet having a porous surface. An electrostatic capacitance of the pellet was measured in the phosphoric acid solution. The measured electrostatic capacitance was 100 micro-F.

An dielectric oxide coating film was formed on the porous surface of the tantalum porous pellet. A silane coupling agent was applied on the dielectric oxide coating film which coats the tantalum porous pellet for natural dry and subsequent heat dry at 125° C., thereby to form a first silane coupling agent layer on entire surface of the dielectric oxide coating film which coats the tantalum porous pellet.

Subsequently, first conductive polymer layers of polypyrrole were formed within pores on the porous surface of the tantalum porous pellet by a chemical polymerization. A silane coupling agent was again applied for natural dry and subsequent heat dry at 125° C., thereby to form a second silane coupling agent layer. A second conductive polymer layer of polypyrrole was formed by an electrolyte polymerization. A graphite layer and a silver paste layer were formed. An external electrode was provided and then an armor resin film was further provided, thereby completing the novel solid electrolyte capacitor of FIG. 3.

EXAMPLE 4

A rectangular parallelepiped tantalum pellet of 3.0 mm×3.2 mm×1.5 mm was prepared to be subsequently subjected to an anodic oxidation in a phosphoric acid solution applied with a voltage thereby to form a tantalum porous pellet having a porous surface. An electrostatic capacitance of the pellet was measured in the phosphoric acid solution. The measured electrostatic capacitance was 100 micro-F.

An dielectric oxide coating film was formed on the porous surface of the tantalum porous pellet. A silane coupling agent was applied on the dielectric oxide coating film which coats the tantalum porous pellet for natural dry and subsequent heat dry at 125° C., thereby to form a first silane coupling agent layer on entire surface of the dielectric oxide coating film which coats the tantalum porous pellet.

Subsequently, first conductive polymer layers of polythiophene were formed within pores on the porous surface of the tantalum porous pellet by a chemical polymerization. A silane coupling agent was again applied for natural dry and subsequent heat dry at 125° C., thereby to form a second silane coupling agent layer. A second conductive polymer layer of polypyrrole was formed by an electrolyte polymerization. A graphite layer and a silver paste layer were formed. An external electrode was provided and then an armor resin film was further provided, thereby completing the novel solid electrolyte capacitor of FIG. 3.

COMPARATIVE EXAMPLE 1

A rectangular parallelepiped tantalum pellet of 3.0 mm×3.2 mm×1.5 mm was prepared to be subsequently subjected to an anodic oxidation in a phosphoric acid solution applied with a voltage thereby to form a tantalum porous pellet having a porous surface. An electrostatic capacitance of the pellet was measured in the phosphoric acid solution. The measured electrostatic capacitance was 100 micro-F.

An dielectric oxide coating film was formed on the porous surface of the tantalum porous pellet. A silane coupling agent was applied on the dielectric oxide coating film which coats the tantalum porous pellet for natural dry and subsequent heat dry at 125° C., thereby to form a first silane coupling agent layer on entire surface of the dielectric oxide coating film which coats the tantalum porous pellet.

Figure 6:
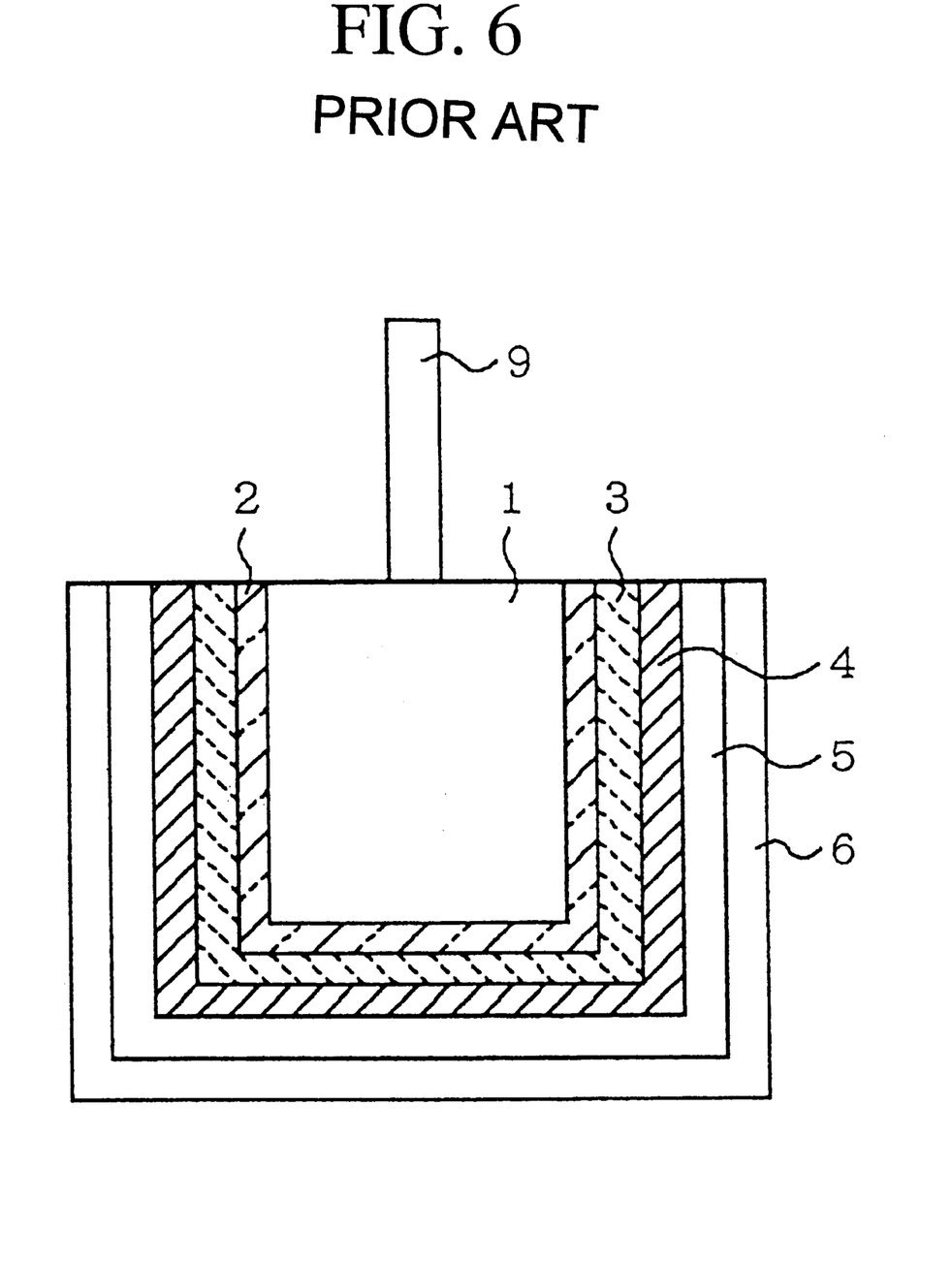
FIG. 6 is a fragmentary cross sectional elevation view illustrative of the conventional solid electrolyte capacitor having the semiconductor layer comprising the conductive polymer in comparative examples.

Subsequently, a first conductive polymer layer of polypyrrole was formed entirely on the first silane coupling agent layer by a chemical polymerization. A graphite layer and a silver paste layer were formed. An external electrode was provided and then an armor resin film was further provided, thereby completing the solid electrolyte capacitor of FIG. 6.

COMPARATIVE EXAMPLE 2

A rectangular parallelepiped tantalum pellet of 3.0 mm×3.2 mm×1.5 mm was prepared to be subsequently subjected to an anodic oxidation in a phosphoric acid solution applied with a voltage thereby to form a tantalum porous pellet having a porous surface. An electrostatic capacitance of the pellet was measured in the phosphoric acid solution. The measured electrostatic capacitance was 100 micro-F.

An dielectric oxide coating film was formed on the porous surface of the tantalum porous pellet. A silane coupling agent was applied on the dielectric oxide coating film which coats the tantalum porous pellet for natural dry and subsequent heat dry at 125° C., thereby to form a first silane coupling agent layer on entire surface of the dielectric oxide coating film which coats the tantalum porous pellet.

Subsequently, a first conductive polymer layer of polythiophene was formed entirely on the first silane coupling agent layer by a chemical polymerization. A graphite layer and a silver paste layer were formed. An external electrode was provided and then an armor resin film was further provided, thereby completing the solid electrolyte capacitor of FIG. 6.

The solid electrolyte capacitors of EXAMPLES 1 through 4 and COMPARATIVE EXAMPLES 1 and 2 were placed under a high temperature condition, for example, at 150° C. for one hour so as to confirm rate of occurrence of peeling the conductive polymer layer. The results are shown on Table 1.

TABLE 1

|  | Ex. 1 | Ex. 2 | Ex. 3 | Ex. 4 | Comp. Ex. 1 | Comp. Ex. 2 |
| --- | --- | --- | --- | --- | --- | --- |
| Rate | 0% | 0% | 0% | 0% | 7% | 6% |

The above Table 1 shows that the present invention prevents peeling the conductive polymer layer from a porous surface of the pellet for improvement in reliability of the capacitor.

The solid electrolyte capacitors of EXAMPLES 1 through 4 and COMPARATIVE EXAMPLES 1 and 2 were placed under a high temperature condition, for example, at 150° C. for 250 hours so as to confirm the rate of variation in equivalent series resistance (ESR) of the capacitors, wherein the rate of variation in equivalent series resistance (ESR) is defined to be a ratio of ESR value after 250 h at 150° C. to initial ESR value. The results are shown on Table 2.

TABLE 2

|  | Ex. 1 | Ex. 2 | Ex. 3 | Ex. 4 | Comp. Ex. 1 | Comp. Ex. 2 |
| --- | --- | --- | --- | --- | --- | --- |
| Rate | 1.10 | 1.09 | 1.11 | 1.08 | 1.78 | 1.54 |

The above Table 2 shows that the present invention suppresses variation in equivalent series resistance for improvement in reliabiliy of the capacitor.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A multilayer structure in a solid electrolyte capacitor, said multilayer structure extending over a pore and a peripheral surface in the vicinity of said pore in a porous surface, said multilayer structure comprising:
   a dielectric layer comprising a first part extending on an inner surface of said pore and a second part extending on an outer surface of said peripheral surface;
   a first coupling layer extending on said first part of said dielectric layer;
   a first conductive polymer layer extending on said first coupling layer;
   a second coupling layer extending on at least said second part of said dielectric layer; and
   a second conductive polymer layer extending on said second coupling layer so that said second conductive polymer layer extends at least over said peripheral surface.

2. The multilayer structure as claimed in claim 1, wherein said second coupling layer extends both on said second part of said dielectric layer and on said first conductive polymer.

3. The multilayer structure as claimed in claim 2, wherein said second conductive polymer extends on a part of said second coupling layer so that said second conductive polymer extends over said peripheral surface only.

4. A solid electrolyte capacitor comprising:
   a valve metal having a porous surface comprising pores and peripheral surfaces;
   a dielectric layer comprising first parts coating inner surfaces of said pores and second parts coating said peripheral surfaces;
   a multilayer structure coating said dielectric layer; and
   at least one conductive layer that coats said multilayer structure,
   said multilayer structure comprising,
   a first coupling layer extending on said first parts of said dielectric layer,
   a first conductive polymer layer extending on said first coupling layer,
   a second coupling layer extending on at least said second parts of said dielectric layer, and
   a second conductive polymer layer extending on said second coupling layer so that said second conductive polymer layer extends at least over said peripheral surfaces.

5. The solid electrolyte capacitor as claimed in claim 4, wherein said second coupling layer extends both on said second part of said dielectric layer and on said first conductive polymer layer.

6. The solid electrolyte capacitor as claimed in claim 5, wherein said second conductive polymer layer extends on a part of said second coupling layer so that said second conductive polymer extends over said peripheral surfaces only.

* * * * *